US012762442B2

(12) United States Patent
Cao et al.

(10) Patent No.: US 12,762,442 B2
(45) Date of Patent: Oct. 13, 2026

(54) QUANTUM COMPUTING SYSTEM AND METHOD FOR TIME EVOLUTION OF BIPARTITE HAMILTONIANS ON A LATTICE

(71) Applicant: Zapata Computing, Inc., Boston, MA (US)

(72) Inventors: Yudong Cao, Cambridge, MA (US); Jonathan P. Olson, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 976 days.

(21) Appl. No.: 17/908,210

(22) PCT Filed: Mar. 26, 2021

(86) PCT No.: PCT/US2021/024308
§ 371 (c)(1),
(2) Date: Aug. 30, 2022

(87) PCT Pub. No.: WO2021/247125
PCT Pub. Date: Dec. 9, 2021

(65) Prior Publication Data

US 2023/0131510 A1 Apr. 27, 2023

Related U.S. Application Data

(60) Provisional application No. 63/000,125, filed on Mar. 26, 2020.

(51) Int. Cl.
*G06N 10/60* (2022.01)
*G06N 10/20* (2022.01)
*G06N 10/80* (2022.01)

(52) U.S. Cl.
CPC ............ *G06N 10/20* (2022.01); *G06N 10/80* (2022.01)

(58) Field of Classification Search
None
See application file for complete search history.

(56) References Cited

U.S. PATENT DOCUMENTS 9,663,358 B1 5/2017 Cory
9,858,531 B1 * 1/2018 Monroe ................ G06N 10/40
(Continued)

FOREIGN PATENT DOCUMENTS

EP 3504667 7/2019
EP 4104114 A1 12/2022
(Continued)

OTHER PUBLICATIONS

O'Gorman et al. (O'Gorman) "Generalized swap networks for near-term quantum computing" arXiv preprint arXiv:1905.05118, 2019, arxiv.org, https://doi.org/10.48550/arXiv.1905.05118, May 14, 2019 (Year: 2019).*
(Continued)

*Primary Examiner* — Xuyang Xia
(74) *Attorney, Agent, or Firm* — Young Basile Hanlon & MacFarlane, P.C.

(57) ABSTRACT

A method evolves a lattice of qubits in a quantum computer. The lattice of qubits includes a first plurality of qubits and a second plurality of qubits in the quantum computer. Each qubit in the first plurality of qubits is adjacent to at least one qubit in the second plurality of qubits. The method includes: (A) applying, in parallel, a first set of quantum gates between the first plurality of qubits and the second plurality of qubits to create a first set of entangled pairs of qubits; (B) after (A), swapping, in parallel, pairs of qubits, the swapping comprising: (B) (1) swapping pairs of adjacent qubits in the first plurality of qubits according to a first swap criterion; and (B) (2) swapping pairs of adjacent qubits in the second plurality
(Continued)

of qubits according to a second swap criterion, wherein the second swap criterion differs from the first swap criterion.

13 Claims, 7 Drawing Sheets

(56) References Cited

U.S. PATENT DOCUMENTS

| | | | | |
|---|---|---|---|---|
| 11,468,289 | B2 | 10/2022 | Cao et al. | |
| 11,605,015 | B2 | 3/2023 | Anschuetz | |
| 11,636,370 | B2 | 4/2023 | Romero | |
| 2007/0239366 | A1 | 10/2007 | Hilton | |
| 2007/0288684 | A1 | 12/2007 | Bergou | |
| 2012/0155870 | A1* | 6/2012 | Harrison | H04B 10/70 398/45 |
| 2015/0032994 | A1 | 1/2015 | Chudak | |
| 2015/0317558 | A1 | 11/2015 | Adachi | |
| 2015/0363708 | A1 | 12/2015 | Amin | |
| 2017/0223094 | A1 | 8/2017 | Johnson | |
| 2017/0364362 | A1 | 12/2017 | Lidar | |
| 2017/0364796 | A1 | 12/2017 | Wiebe | |
| 2018/0165601 | A1 | 6/2018 | Wiebe | |
| 2018/0247200 | A1 | 8/2018 | Rolfe | |
| 2019/0197358 | A1 | 6/2019 | Madani | |
| 2019/0213495 | A1 | 7/2019 | Babbush | |
| 2019/0354897 | A1 | 11/2019 | Horesh | |
| 2019/0384597 | A1 | 12/2019 | Horesh | |
| 2019/0393399 | A1 | 12/2019 | Leipold | |
| 2020/0057957 | A1 | 2/2020 | Johnson | |
| 2020/0117702 | A1 | 4/2020 | Babbush | |
| 2020/0118025 | A1 | 4/2020 | Romero | |
| 2020/0134502 | A1 | 4/2020 | Anschuetz | |
| 2020/0293937 | A1* | 9/2020 | Babbush | G06N 10/40 |
| 2020/0394537 | A1 | 12/2020 | Wang | |
| 2020/0394544 | A1* | 12/2020 | Low | G06N 10/20 |
| 2021/0152189 | A1* | 5/2021 | Murali | G06N 10/20 |
| 2021/0232963 | A1 | 7/2021 | Gimeno-Segovia | |
| 2021/0256351 | A1 | 8/2021 | Cao | |
| 2021/0279134 | A1* | 9/2021 | Versluis | G06F 11/1076 |
| 2021/0287761 | A1 | 9/2021 | Camps | |
| 2022/0383177 | A1 | 12/2022 | Alcazar | |
| 2023/0147890 | A1 | 5/2023 | Cao | |

FOREIGN PATENT DOCUMENTS

| | | | |
|---|---|---|---|
| EP | 4128085 | A2 | 2/2023 |
| KR | 20160147988 | A | 12/2016 |
| KR | 101822326 | B1 | 1/2018 |
| WO | 2017001404 | A1 | 1/2017 |
| WO | 2017066695 | A1 | 4/2017 |
| WO | 2018064535 | A1 | 4/2018 |
| WO | 2019032103 | A1 | 2/2019 |
| WO | 2019070228 | | 4/2019 |
| WO | 2019077240 | A1 | 4/2019 |
| WO | 2019177951 | A1 | 9/2019 |
| WO | 2020037253 | A1 | 2/2020 |
| WO | 2020077288 | A1 | 4/2020 |
| WO | 2020086867 | A1 | 4/2020 |
| WO | 2020077288 | A9 | 3/2021 |
| WO | 2021102344 | A1 | 5/2021 |
| WO | 2021163487 | A1 | 8/2021 |
| WO | 2021247125 | A2 | 12/2021 |
| WO | 2021247125 | A3 | 2/2022 |
| WO | 2022155277 | A1 | 7/2022 |
| WO | 2022173497 | A1 | 8/2022 |
| WO | 2022173497 | A9 | 9/2022 |

OTHER PUBLICATIONS

Extended European Search Report mailed Dec. 7, 2021, in European patent application 19874946.7, 11 pages.

You, Y., et al., "Machine learning spatial geometry from entanglement features," Phys. Rev. B 97, 045153, pp. 1-15 (Jan. 31, 2018).

International Search Report & Written Opinion mailed Mar. 29, 2022, in international patent application No. PCT/US2022/012227, 6 pages.

Notice of Allowance mailed Apr. 15, 2022, for U.S. Appl. No. 17/174,900 of Yudong Cao, filed Feb. 12, 2021, 10 pages.

Horgan, J., "Will Quantum Computing Ever Live Up to Its Hype?", Quantum Computing, Scientific American, pp. 6 (Apr. 20, 2021).

Non-Final Office Action mailed May 11, 2022, in U.S. Appl. No. 16/543,165 of Peter D. Johnson, filed Aug. 16, 2019, 26 pages.

"Quantum Computing: Progress and Prospects" National Academies of Sciences, Engineering, and Medicine, pp. 1-273 (2019).

Gregory, A., and Chiang, C., "Simulation of Quantum Walks via Hamiltonian Reduction", 2018 IEEE Nanotechnology Symposium (ANTS), pp. 1 (2018) (Abstract).

Cubitt, T., and Montanaro, A., "Complexity Classification of Local Hamiltonian Problems", 2014 IEEE 55th Annual Symposium on Foundations of Computer Science, p. 3 (2014) (Abstract).

Non-Final Office Action mailed May 17, 2022, in U.S. Appl. No. 16/662,895 of Eric R. Anschuetz, filed Oct. 24, 2019, 29 pages.

Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).

Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).

Extended European Search Report mailed May 19, 2022, in European patent application No. 19850377.3, 10 pages.

Jordan, P., et al., "In The Collected Works of Eugene Paul Wigner: Part A: The Scientific Papers—Chapter: Über das Paulische Äquivalenzverbot", pp. 109-129. Springer (1993).

Final Office Action mailed Aug. 25, 2022, in U.S. Appl. No. 16/543,165 of Peter D. Johnson, filed Aug. 16, 2019, 73 pages.

International Search Report and Written Opinion mailed Dec. 6, 2019 in PCT International Patent Application No. PCT/US2019/046895, 9 pages.

Bonet-Monroig, "Comparison of Error mitigation Strategies in a Hydrogen Molecule Quantum Simulation", Master thesis. Leiden University, pp. 1-52 (May 29, 2018).

Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.

Schlittgen, B., et al., "Low-Energy Effective Theories of Quantum Spin and Quantum Link Models", Physical Review D, vol. 63. No. 8, pp. 1-29 (Mar. 19, 2001).

Moll, N., et al, "Quantum optimization using variational algorithms on near-term quantum devices," Quantum Science and Technology, vol. 3, pp. 18 (Jun. 19, 2018) [retrieved on Nov. 25, 2019]. Retrieved from <https://iopscience.iop.org/article/10.1088/2058-9565/aab822/pdf>.

McClean, J. R., et al., "The theory of variational hybrid quantum-classical algorithms", New Journal of Physics, vol. 18, pp. 1-22 (Feb. 5, 2016).

Romero et al., "Quantum autoencoders for efficient compression of quantum data", arXiv:1612.02806v2, Feb. 10, 2017, 11 pages . . . [retrieved on Jan. 20, 2020]. Retrieved from <https://arxiv.org/abs/1612.02806>.

International Search Report and Written Opinion mailed Feb. 4, 2020, in International Patent Application No. PCT/US2019/055970, 11 pages.

Ackley, D.H., et al., "A Learning Algorithm for Boltzmann Machines", Cognitive Science, vol. 9, No. 1, pp. 147-169 (1985).

Amin, M.H., et al., "Quantum Boltzmann Machine", Physical Review X, vol. 8, No. 1, Available online https://journals.aps.org/prx/abstract/10.1103/PhysRevX.8.021050, pp. 021050-1-021050-11 (May 23, 2018).

Kieferova, M., et al, "Tomography and generative training with quantum Boltzmann machines", Phys. Rev. A, vol. 96, No. 6. 062327, pp. 1-2 (Dec. 22, 2017).

(56) References Cited

OTHER PUBLICATIONS

Mandra, S., et al., “Strengths and weaknesses of weak-strong cluster problems: A detailed overview of state-of-the-art classical heuristics versus quantum approaches”, Phys. Rev. A, vol. 94, No. 6, 022337, pp. 1-14 (Aug. 29, 2016).
Benedetti, M., et al., “Estimation of effective temperatures in quantum annealers for sampling applications: A case study with possible applications in deep learning”, Phys. Rev. A, vol. 94, No. 2, 022308, pp. 1-15 (Aug. 9, 2016).
McClean, J. R., et al., “Barren plateaus in quantum neural network training landscapes”, Nature Communications, vol. 9, pp. 1-6, (2018).
Verdon, G., et al., “A quantum algorithm to train neural networks using low-depth circuits”, Quantum Physics, arXiv:1712.05304 [quant-ph], pp. 1-9 (Dec. 14, 2017).
Srednicki, M., “Chaos and quantum thermalization”, Phys. Rev. E, vol. 50, No. 2, 888, pp. 1-30 (Apr. 1, 1994).
Deutsch, J.M., “Quantum statistical mechanics in a closed system”, Phys. Rev. A, vol. 43, No. 4, pp. 2046-2049 (Feb. 15, 1991).
D’Alessio, L., et al., “From quantum chaos and eigenstate thermalization to statistical mechanics and thermodynamics”, Advances in Physics, vol. 65, No. 3, pp. 1-130 (2016).
Garrison, J.R., et al., “Does a Single Eigenstate Encode the Full Hamiltonian?” Physical Review X, vol. 8, No. 2, pp. 021026-1-021026-24 (2018).
Kaufman, A.M., et al., “Quantum thermalization through entanglement in an isolated many-body system”, Science, vol. 353, No. 6301, Aug. 19, 2016, pp. 794-800.
Biamonte, J.D., et al., “Realizable Hamiltonians for universal adiabatic quantum computers”, Phys. Rev. A, vol. 78, No. 1, 012352, pp. 1-7 (2008).
Kiefer, J., et al., “Stochastic Estimation of the Maximum of a Regression Function”, Ann. Math. Statist. Vol. 23, No. 3, pp. 462-466 (1952).
Spall, J.C., “A Stochastic Approximation Technique for Generating Maximum Likelihood Parameter Estimates”, in 1987 American Control Conference, pp. 1161-1167 (1987).
Barahona, F., “On the computational complexity of Ising spin glass models”, Journal of Physics A: Mathematical and General, vol. 15, No. 10, pp. 3241-3253 (1982).
Dallaire-Demers, P.L., et al., “Low-depth circuit ansatz for preparing correlated fermionic states on a quantum computer”, Quantum Physics, arXiv:1801.01053v1 , pp. 1-15 (Jan. 3, 2018).
Benedetti, M., et al., “Quantum-assisted Helmholtz machines: A quantum-classical deep learning framework for industrial datasets in near-term devices”, Quantum Physics, ArXiv 1708.09784v3, pp. 1-11 (Mar. 19, 2018).
Goodfellow, I. J., et al., “Generative Adversarial Networks”, arXiv:1406.2661v1 [stat.ML], 2014, pp. 1-9 (Jun. 10, 2014).
Rolfe, J.T., “Discrete Variational Autoencoders”, ICLR, pp. 1-33 (Apr. 22, 2017).
Romero, J., et al., “Strategies for quantum computing molecular energies using the unitary coupled cluster ansatz”, arXiv:1701.02691v2 [quant-ph], vol. 4, No. 4, pp. 1-18 (Feb. 10, 2018).
Mitarai, K., et al., “Quantum Circuit Learning”, Phys. Rev. A 98, 032309, DOI:10.1103/PhysRevA.98.032309, arXiv:1803.00745 [quant-ph], pp. 1-7 (2019).
Huggins, W., et al., “Towards quantum machine learning with tensor networks”, Quantum Science and Technology, arXiv:1803.1153v2, vol. 4, No. 2, pp. 1-12 (Jul. 31, 2018).
Romero, J., and Aspuru-Guzik, A., “Variational quantum generators: Generative adversarial quantum machine learning for continuous distributions”, Quantum Physics, arXiv:1901.00848 [quant-ph], pp. 1-15 (Jan. 3, 2019).
McKinsey & Company, “Quantum Technology Monitor”, pp. 1-53 (Jun. 2022).
Non-Final Office Action mailed Dec. 6, 2022, in U.S. Appl. No. 16/543,165 of Peter D. Johnson, filed Aug. 16, 2019, 23 pages.
Notice of Allowance mailed Jan. 13, 2023 for U.S. Appl. No. 16/600,312, of Jhonathan Romero, filed Oct. 11, 2019, pp. 21.
Extended European Search Report issued in App. No. EP21817132, dated Mar. 22, 2024, 7 pages.
Lanting T et al, “Entanglement in a quantum annealing processor”, arxiv.org, Cornell University Library, 201 Olin Library Cornell University Ithaca, NY 14853, (Jan. 15, 2014), doi: 10.1103/PHYSREVX.4.021041, XP080002029.
O’Gorman Bryan et al, “Generalized swap networks for near-term quantum computing”, (May 13, 2019), URL: https://arxiv.org/pdf/1905.05118.pdf, (Dec. 9, 2021), XP055871093.
Supplementary European Search Report issued in App. No. EP21817132, dated Apr. 9, 2024, 1 pages.
Unanyan R G et al, “Short-time vs. long-time dynamics of entanglement in quantum lattice models”, arxiv.org, Cornell University Library, 201 Olin Library Cornell University Ithaca, NY 14853, (Oct. 20, 2009), doi:10.1103/PHYSREVA.81.022119, XP080372976.
Preskill, J., “Quantum Computing in the NISQ era and beyond”, Jul. 31, 2018, pp. 1-20.
International Search Report and Written Opinion mailed Feb. 10, 2020 in International patent application No. PCT/US2019/057893, 7 pages.
Schuld, M., et al., “Quantum machine learning in feature Hilbert spaces”, Quantum Physics, arXiv:1803.07128, pp. 1-12 (Mar. 19, 2018).
Motta, M., et al., “Low rank representations for quantum simulation of electronic structure”, Computational Physics, Quantum Physics, arXiv:1808.02625v2, pp. 1-8 (Aug. 9, 2018).
Wecker, D., et al., “Progress towards practical quantum variational algorithms”, Phys. Rev. A 92, 042303, pp. 1-11 (Sep. 8, 2015).
Du, Y., et al., “The Expressive Power of Parameterized Quantum Circuits”, arXiv preprint arXiv:1810.11922V1, pp. 1-15 (2018).
Liu, Y., et al., “Quantum computational complexity of the N-representability problem: QMA complete”, Physical review letters, vol. 98, No. 11, pp. 1-6 (2007).
Biamonte, J., et al., “Quantum machine learning”, Nature 549, pp. 195-292 (2016).
Niemann, P., et al., “Logic Synthesis for Quantum State Generation”, 2016 IEEE 46th International Symposium on Multiple-Valued Logic (ISMVL), Sapporo, pp. 247-252 (2016).
M. Plesch, M., and Brukner, C., “Quantum-State Preparation with Universal Gate Decompositions”, Phys. Rev. A 83, arXiv:1003.5760v2, 032302, pp. 1-5 (Mar. 4, 2011).
Soklakov, A. N., and Schack, R., “Efficient state preparation for a register of quantum bits”, Phys. Rev. A, 012307, arXiv:quant-ph/0408045v2, vol. 73, No. 1, pp. 1-26 (Nov. 22, 2005).
Grover, L., and Rudolph, T., et al., “Creating superpositions that correspond to efficiently integrable probability distributions”, arXiv preprint quantph/0208112v1, pp. 1-2 (2002).
Zeng, J., et al., “Learning and Inference on Generative Adversarial Quantum Circuits”, arXiv preprint arXiv:1808.02893, vol. 99, No. 5, pp. 1-7 (2018).
Dallaire-Demers, P.L., and Killoran, N., “Quantum generative adversarial networks”, arXiv:1804.08641v2, Phys. Rev. A, vol. 98, 012324, pp. 1-10 (Apr. 30, 2018).
Kadurin, A., et al., “druGAN: An Advanced Generative Adversarial Autoencoder Model for de Novo Generation of New Molecules with Desired Molecular Properties in Silico,” Molecular Pharmaceutics 2017, vol. 14, 9, pp. 3098-3104 (Jul. 13, 2017) (Abstract).
Garcia-Saez, A., et al., “Local Temperature in Quantum Thermal States”, vol. 79, No. 5, arXiv: 0808.0102v2, pp. 1-10 (Jun. 2, 2009).
Rubin, N.C., “A Hybrid Classical/Quantum Approach for Large-Scale Studies of Quantum Systems with Density Matrix Embedding Theory”, Quantum Physics, arXiv:1610.06910 [quant-ph], pp. 1-10, (2016).
Reiher, M., et al., “Elucidating Reaction Mechanisms on Quantum Computers”, PNAS, vol. 114, No. 29, pp. 1-28 (2016).
Anschuetz, E.R., and Cao, Y., “Realizing Quantum Boltzmann Machines Through Eigenstate Thermalization,” arXiv preprint, arXiv:1903.01359 [quant-ph], pp. 1-30 (Mar. 4, 2019).
International Search Report & Written Opinion mailed Jan. 14, 2022, in international patent application No. PCT/US2021/024308, 7 pages.

(56) References Cited

OTHER PUBLICATIONS

Steiger, D.S., et al., "Advantages of a modular high-level quantum programming framework," arXiv:1806.01861, pp. 1-11 (Jun. 5, 2018).
Zhao, P., et al., "High-contrast ZZ interaction using superconducting qubits with opposite-sign anharmonicity," arXiv:2002.07560v2, pp. 1-16 (Mar. 27, 2021).
Peruzzo, A., et al., "A variational eigenvalue solver on a photonic quantum processor", Nature Communications, vol. 5, Article No. 4213, pp. 1-7 (2014).
Farhi, E., et al., "A quantum approximate optimization algorithm", Quantum Physics, arXiv:1411.4028v1, pp. 1-16 (Nov. 14, 2014).
Shor, P.W., "Algorithms for quantum computation: Discrete logarithms and factoring", Proceedings 35th Annual Symposium on Foundations of Computer Science (Shafi Goldwasser, ed.), IEEE, pp. 124-134 (1994).
Lloyd, S., "Universal Quantum Simulators", Science, vol. 273, No. 5278, pp. 1073-1078 (Aug. 23, 1996).
Wendin, G., "Quantum information processing with superconducting circuits: a review", Reports on Progress in Physics, vol. 80, No. 10, pp. 108 (2017).
Aaronson, S., and Chen, L., "Complexity-Theoretic Foundations of Quantum Supremacy Experiments", arXiv:1612.05903v2, pp. 1-66 (Dec. 26, 2016).
Boixo, S., et al., "Characterizing Quantum Supremacy in Near-Term Devices", Nature Physics, vol. 14, pp. 1-23 (Aug. 3, 2016).
Johnson, P. D., et al., "QVECTOR: an algorithm for device-tailored quantum error correction", arXiv preprint arXiv:1711.02249v1, pp. 1-16 (Nov. 7, 2017).
Cao, Y., et al., "Quantum Neuron: an elementary building block for machine learning on quantum computers", arXiv:1711.11240v1, pp. 1-30 (2017).
Havlicek, V., et al., "Supervised learning with quantum enhanced feature spaces", arXiv:1804.11326v2, pp. 1-22 (Jun. 5, 2018).
Schuld, M., et al., "Circuit-centric quantum classifiers", arXiv:1804.00633v1, pp. 1-17 (Apr. 2, 2018).
Purvis, G.D., et al., "A full coupled-cluster singles and doubles model: The inclusion of disconnected triples", The Journal of Chemical Physics, vol. 76, No. 4, pp. 1910-1918 (Feb. 15, 1982).
Farhi, E., and Neven, H., "Classification with Quantum Neural Networks on Near Term Processors", arXiv preprint arXiv:1802.06002v2, pp. 1-21 (Aug. 30, 2018).
Grant, E., et al., "Hierarchical quantum classifiers", npj Quantum Information, vol. 4, Article No. 65 ISSN 2056-6387, pp. 1-8 (2018).
Chen, H., et al., "Universal discriminative quantum neural networks", arXiv preprint arXiv:1805.08654v1, pp. 1-19 (May 22, 2018).
Sim, S., et al., "A framework for algorithm deployment on cloud-based quantum computers", arXiv preprint arXiv:1810.10576v1, pp. 1-10 (Oct. 24, 2018).
Perdomo-Ortiz, A., et al., "Opportunities and challenges for quantum-assisted machine learning in near-term quantum computers", Quantum Science and Technology, vol. 3, No. 3, pp. 1-14 (2018).
Benedetti, M., et al., "A generative modeling approach for benchmarking and training shallow quantum circuits", arXiv preprint arXiv:1801.07686v4, pp. 1-16 (Jun. 2, 2019).
Zeng, J., et al., "Learning and Inference on Generative Adversarial Quantum Circuits", arXiv preprint arXiv:1808.03425v1, pp. 1-7 (2018).
Situ, H., et al., "Quantum generative adversarial network for discrete data", arXiv preprint arXiv:1807.01235v5, pp. 1-22 (2019).
Liu, J., and Wang, L., "Differentiable learning of quantum circuit Born machines", Phys. Rev. A 98, 062324, pp. 1-9 (2018).
Goodfellow, I. J., et al., "Generative adversarial nets", in Advances in neural information processing systems, pp. 1-9 (2014).
Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).
Lloyd, S., and Weedbrook, C., "Quantum Generative Adversarial Learning", Phys. Rev. Lett. vol. 121, No. 4, pp. 040502-1-040502-5 (2018).
Baydin, A. G., et al., "Automatic Differentiation in Machine Learning: a Survey", Journal of Machine Learning Research, vol. 18, No. 1, pp. 1-43 (2018).
Bergholm, V., et al., "PennyLane: Automatic differentiation of hybrid quantumclassical computations", arXiv preprint arXiv:1811.04968v3, pp. 1-15 (2018).
Goodfellow, I., "NIPS 2016 Tutorial: Generative Adversarial Networks", arXiv preprint arXiv:1701.00160v4, pp. 1-57 (2016).
Radford, A., et al., "Unsupervised Representation Learning with Deep Convolutional Generative Adversarial Networks", arXiv preprint arXiv:1511.06434, pp. 1-16 (2015).
Creswell, A., et al., "Generative Adversarial Networks: An Overview", IEEE Signal Processing Magazine, vol. 35, No. 1, pp. 1-14 (2017).
Gómez-Bombarelli, R., et al., "Automatic Chemical Design Using a Data-Driven Continuous Representation of Molecules", ACS Cent. Sci., vol. 4, No. 2, pp. 268-276 (2018).
Aspuru-Guzik, A., et al., "The Matter Simulation (R)evolution", ACS Cent. Sci., 4, 2, pp. 144-152 (2018).
Guimaraes, G., et al., "Objective-Reinforced Generative Adversarial Networks (ORGAN) for Sequence Generation Models", arXiv preprint arXiv:1705.10843v3, pp. 1-7 (2018).
Handy, N.C., et al., "Size-consistent Brueckner theory limited to double substitutions", Chemical Physics Letters, vol. 164, No. 2-3, pp. 185-192 (Dec. 8, 1989).
Sanchez-Lengeling, B., and Aspuru-Guzik, A., "Inverse molecular design using machine learning: Generative models for matter engineering", Science 27, vol. 361, No. 6400, pp. 360-365 (Jul. 27, 2018).
Sanchez-Lengeling, B., et al., "Optimizing distributions over molecular space. An Objective-Reinforced Generative Adversarial Network for Inverse-design Chemistry (ORGANIC)", ChemRxiv preprint chemrxiv.5309668.v2, pp. 1-20 (2017).
Gao, N., et al., "High Dimensional Similarity Search with Quantum-Assisted Variational Autoencoder," arXiv:2006.0768v1, Available at URL https://arxiv.org/pdf/2006.07680.pdf, pp. 1-9 (Jun. 13, 2020).
Han, Z., et al., "Unsupervised Generative Modeling Using Matrix Product States," arXiv:1709.01662v3, Available online at URL https:/arxiv.org/pdf/1709.01662.pdf, pp. 1-13 (Jul. 19, 2018).
International Search Report and Written Opinion mailed Sep. 29, 2022, in PCT patent application No. PCT/US2021/062191, 8 pages.
Niu, M.Y., et al., "Learnability and Complexity of Quantum Samples," arXiv:2010.11983v1. Available at URL < https://arxiv.org/pdf/2010.11983.pdf>, pp. 1-19 (Oct. 22, 2020).
Non-Final Office Action mailed Oct. 14, 2022 for U.S. Appl. No. 16/600,312, of Jhonathan Romero, filed Oct. 11, 2019, pp. 61.
Notice of Allowance mailed Nov. 4, 2022, in U.S. Appl. No. 16/662,895 of Eric R. Anschuetz, filed Oct. 24, 2019, 51 pages.
Yang, S., et al., "Loop Optimization for Tensor Network Renormalization," arXiv:1512.04938v2, Available online at URL <https://arxiv.org/pdf/1512.04938.pdf>, vol. 118, No. 11, pp. 1-15 (Feb. 25, 2017).
Spall, J. C., "Adaptive stochastic approximation by the simultaneous perturbation method", IEEE Transactions on Automatic Control, vol. 45, No. 10, pp. 1839-1853 (Oct. 2000).
Spall, J. C., "A one-measurement form of simultaneous perturbation stochastic approximation", Automatica, vol. 33, No. 1, pp. 109-112 (1997).
Goodfellow, I., et al., "Deep Learning", Book, vol. 1 (MIT press Cambridge, 2016) available online at http://www.deeplearningbook.org, pp. 1-798.
Kandala, A., et al., "Hardware-efficient Variational Quantum Eigensolver for Small Molecules and Quantum Magnets", Nature, vol. 549, pp. 1-24 (2017).
Schuld, M., et al., "Evaluating analytic gradients on quantum hardware", arXiv preprint arXiv:1811.11184v1, pp. 1-8 (2018).
Smith, R. S., et al., "A Practical Quantum Instruction Set Architecture", arXiv preprint arXiv:1608.03355v2, pp. 1-15 (2016).

(56) References Cited

OTHER PUBLICATIONS

Paszke, A., et al., "Automatic differentiation in PyTorch", 31st Conference on Neural Information Processing Systems Long Beach, CA, USA, pp. 1-4 (NIPS 2017).
Mescheder, L., et al., "Which Training Methods for GANs do actually Converge?", International Conference on Machine Learning, pp. 1-39 (2018).
Liu, Y., "The Complexity of the Consistency and N-Representability Problems for Quantum States", Quantum Physics, arXiv preprint arXiv:0712.3041, pp. 1-89 (2007).
Roth, R. M., et al., "Apathy Is Associated with Ventral Striatum Volume in Schizophrenia Spectrum Disorder", J Neuropsychiatry Clin Neurosci, 2016 Summe, vol. 28, No. 3, pp. 1-9 (Published online Feb. 22, 2016. doi: 10.1176/appi.neuropsych.15100241).
Endo, S., et al., "Practical Quantum Error Mitigation for Near-Future Applications", Phys. Rev. X, vol. 8, 031027-1-031027-21 (2018).
Kandala, A., et al., "Extending the computational reach of a noisy superconducting quantum processor", arXiv preprint arXiv:1805.04492v1, pp. 1-10 (2018).
Bengio, Y., et al., "Greedy layer-wise training of deep networks", NIPS'06: Proceedings of the 19th International Conference on Neural Information Processing Systems, pp. 1-8 (Dec. 2006).
He, K., et al., "Deep Residual Learning for Image Recognition", Proceedings of the IEEE conference on computer vision and pattern recognition, pp. 770-778 (2016).
Valiant, L. G., "Quantum computers that Can Be Simulated Classically in Polynomial Time", SIAM Journal on Computing, vol. 31, No. 4, pp. 1-10 (2002).
Cirq, https://github.com/quantumlib/Cirq, Available online, copyright 2019, 2 pages.
Quantum Information Software Kit (QISKit), https://qiskit.org/ (2018).
Steiger, D. S., et al., "ProjectQ: An Open Source Software Framework for Quantum Computing", Quantum, arXiv:1612.08091v2, vol. 2, pp. 1-13 (2016).
Aspuru-Guzik, A., et al., "Simulated Quantum Computation of Molecular Energies", Science, Quantum Physics, vol. 309, No. 5741, pp. 1-21 (Sep. 9, 2005).
Abadi, M., et al., "TensorFlow: Large-Scale Machine Learning on Heterogeneous Distributed Systems", pp. 1-19 (Preliminary White Paper, Nov. 9, 2015), software available from tensorflow.org, http://tensorflow.org/.
Dankert, C., et al., "Exact and approximate unitary 2-designs and their application to fidelity estimation", Physical Review A, vol. 80, No. 1, 012304, pp. 1-7 (Jul. 2009).
Endo, S., et al., "Variational quantum algorithms for discovering Hamiltonian spectra", Physical Review A, arXiv preprint arXiv:1806.05707, pp. 1-9 (2018).
Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).
Bogoljubov, N.N., "A New Method in the Theory of Superconductivity", Soviet Physics JETP, vol. 34, No. 7, pp. 41-46 (Jul. 1958).
Brassard, G., et al., "Quantum Amplitude Amplification and Estimation", arXiv:quant-ph/0005055v1, pp. 1-22 (May 15, 2000).
Bach, V., et al., "Generalized Hartree-Fock Theory and the Hubbard Model", Journal of Statistical Physics, vol. 76(1-2):3-89, pp. 1-68 (Nov. 25, 1993).
Bravyi, L. D., et al., "Fermionic Quantum Computation", Annals of Physics, vol. 298, No. 1, pp. 210-226 (2002).
McClean, J.R., et al., "Hybrid Quantum-Classical Hierarchy for Mitigation of Decoherence and Determination of Excited States", Physical Review A, vol. 95, No. 4, pp. 1-10 (2017).
Wang, D., et al., "Accelerated Variational Quantum Eigensolver", arXiv:1802.00171v3, pp. 1-11 (Mar. 25, 2019).
Colless, J.I., et al., "Computation of Molecular Spectra on a Quantum Processor with an Error-Resilient Algorithm", Physical Review X, vol. 8, No. 1, pp. 011021-011027 (2018).
Rubin, N. C., et al., "Application of Fermionic Marginal Constraints to Hybrid Quantum Algorithms", New Journal of Physics, vol. 20, No. 5, 053020, pp. 1-21 (2018).
Temme, K., et al., "Error Mitigation for Short-Depth Quantum Circuits", Physical review letters, vol. 119, No. 18, 180509, pp. 1-15 (2017).
Wecker, D., et al., "Towards Practical Quantum Variational Algorithms", Physical Review A, vol. 92, No. 4, 042303, pp. 1-11 (Sep. 8, 2015).
Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).
Dallaire-Demers, P.L., et al., "Quantum Generative Adversarial Networks," Physical Review A, vol. 98, No. 1, p. 012324, pp. 1-10 (Apr. 30, 2018).
Johnson, P.D., et al., "A Method for Improving Quantum Optimization Algorithms: The Marginals Optimization Procedure", ICE 5th Conference on Quantum Information, Spain, (May 28-31, 2019), Book of Abstracts p. 59.
Amin, M.H., et al., "Quantum Boltzmann Machine", Phys. Rev. X 8, 021050 URL:https://arxiv.org/abs/1601.02036, vol. 8, No. 2, Jan. 8, 2016, pp. 1-10.
Anschuetz, E.R., and Zanoci, C., "Near-Term Quantum-Classical Associative Adversarial Networks", Phys. Rev. A, URL: https://arxiv.org/abs/1905.13205, vol. 100, No. 5, 052327, pp. 1-11 (2019).
Wecker, D., et al., "Solving strongly correlated electron models on a quantum computer", Physical Review A, vol. 92, No. 6, pp. 1-27 (2015).
International Search Report and Written Opinion mailed Jun. 7, 2021, in international patent application No. PCT/US2021/017863, 7 pages.
Kaneko, T., and Harada, T., "Noise Robust Generative Adversarial Networks", Cornell University, Available online at [https://arxiv.org/abs/1911.11776v1], Nov. 26, 2019, pp. 1-29.
He, Z., et al., "A Conditional Generative Model Based on Quantum Circuit and Classical Optimization", International Journal of Theoretical Physics, vol. 58, pp. 1138-1149 (2019).
Besnier, V., et al., "This Dataset Does Not Exist: Training Models From Generated Images", Available online at [https://arxiv.org/abs/1911.02888, Nov. 7, 2019, pp. 1-6.
Preskill, J., "Quantum Computing in the NISQ era and beyond", pp. 1-20 (Jul. 31, 2018).
Wang, G., et al., "Minimizing Estimation Runtime on Noisy Quantum Computers," PRX Quantum 2.1 pp. 010346-1-010346-49 (2021).
Wan, K. H., et al., "Quantum generalisation of feedforward neural networks", npj Quantum Information, vol. 3, Article No. 36, arXiv:1612.01045, pp. 1-8 (2017).
Panahi, A., et al., "word2ket: Space-efficient Word Embeddings inspired by Quantum Entanglement," International Conference on Learning Representations 2020, arXiv:1911.04975, pp. 1-10 (Mar. 3, 2020).
Verdon, G., et al., "Quantum Hamiltonian-Based Models and the Variational Quantum Thermalizer Algorithm," Quantum Physics, arXiv:1910.02071, pp. 1-21 (Oct. 4, 2019).
Lloyd, S., et al., "Quantum embeddings for machine learning," https://arxiv.org/abs/2001.03622, pp. 1-11 (Feb. 10, 2020).
Extended European Search Report mailed Dec. 7, 2021, in European patent application 19871859.5, 14 pages.

* cited by examiner

QUANTUM COMPUTING SYSTEM AND METHOD FOR TIME EVOLUTION OF BIPARTITE HAMILTONIANS ON A LATTICE

BACKGROUND

Quantum computers promise to solve industry-critical problems which are otherwise unsolvable or only very inefficiently addressable using classical computers. Key application areas include chemistry and materials, bioscience and bioinformatics, logistics, and finance. Interest in quantum computing has recently surged, in part due to a wave of advances in the performance of ready-to-use quantum computers.

Proposed algorithms and models for quantum computing solutions benefit from short circuits where the number of operations have been minimized; this helps minimize error by maintaining quantum coherence throughout the circuit. Bipartite Hamiltonians, such as those naturally present in quantum Boltzmann machines, require many operations to implement when on a lattice, since physically distant qubits need to be entangled.

SUMMARY

A method evolves a lattice of qubits in a quantum computer. The lattice of qubits includes a first plurality of qubits in the quantum computer and a second plurality of qubits in the quantum computer. Each qubit in the first plurality of qubits is adjacent to at least one qubit in the second plurality of qubits. The method includes: (A) applying, in parallel, a first set of quantum gates between the first plurality of qubits and the second plurality of qubits to create a first set of entangled pairs of qubits; (B) after (A), swapping, in parallel, pairs of qubits, the swapping comprising: (B)(1) swapping pairs of adjacent qubits in the first plurality of qubits according to a first swap criterion; and (B)(2) swapping pairs of adjacent qubits in the second plurality of qubits according to a second swap criterion, wherein the second swap criterion differs from the first swap criterion.

Other features and advantages of various aspects and embodiments of the present invention will become apparent from the following description and from the claims.

DETAILED DESCRIPTION

Figure 4:
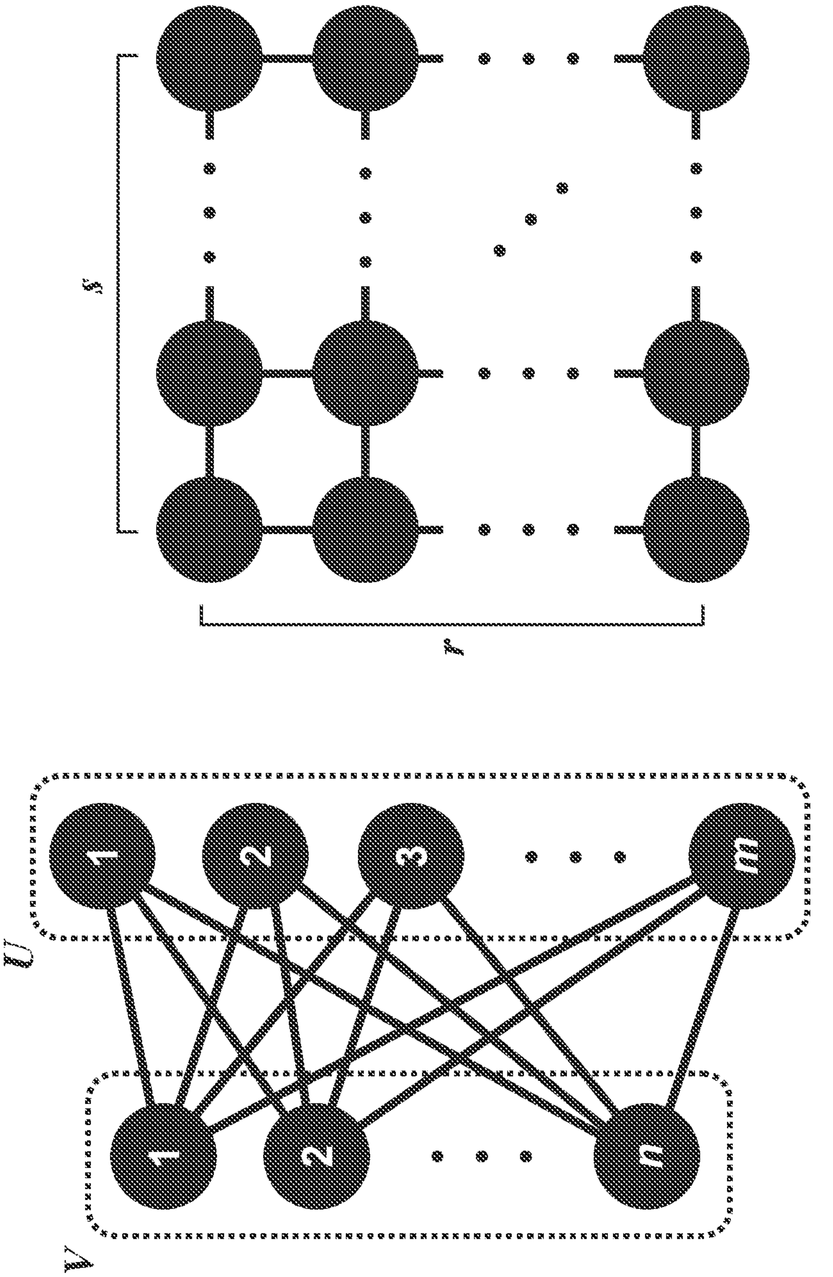
FIG. 4 illustrates a Hamiltonian on an (n, m) bipartite graph according to one embodiment of the present invention.

Embodiments of the present invention are directed to computer systems and methods which implement a compact means of performing time evolution under a Hamiltonian on an (n, m) bipartite graph (FIG. 4):

$$H=\sum_{i=1}^{n}\sum_{j=1}^{m}J_{ij}P_{ij}$$

where $J_{ij}$ are coupling coefficients, $P_{ij}$ is some two-body operator acting on qubit i and j respectively. Some common examples are $P=Z\otimes Z$ (Ising model), $P=X\otimes X+Y\otimes Y$ (Bose-Hubbard model), and $P=X\otimes X+Y\otimes Y+Z\otimes Z$ (Heisenberg model). The ability to perform time evolution is a fundamental building block of many quantum algorithms. A direct application of such ability is for gate-model implementation of a quantum Boltzmann machine.

Embodiments of the present invention include a method for evolving a lattice of qubits. The lattice of qubits comprises a first plurality of qubits and a second plurality of qubits, wherein each qubit of the first plurality of qubits is adjacent to at least one qubit of the second plurality of qubits. The method comprises applying, in parallel, a first set of quantum gates between the first plurality of qubits and the second plurality of qubits to create a first set of entangled pairs of qubits. The method further comprises swapping, in parallel, pairs of adjacent qubits within each plurality, where the swap criterion differs between each set of qubits. In one of the pluralities of qubits, a first swap criterion is applied (e.g., where every even numbered qubit is swapped with the one to its right) while a second swap criterion is applied in the other plurality of qubits (e.g., where every odd numbered qubit is swapped with the one to its right).

Consider, for example, the two-qubit gate set {SWAP, W} where W represents some unitary operator which time evolves two qubits with respect to some Hamiltonian. For example, $W=e^{-i\theta(ZZ)}$ would be a sufficient operator to time evolve a 4-qubit Hamiltonian of the form $H=Z_1Z_2+Z_1Z_3+Z_1Z_4+Z_2Z_3+Z_2Z_4+Z_3Z_4$. W may be a parameterized gate with continuous or discrete values for its parameters. For each vertex of the bipartite graph, we assign a single qubit. In order to satisfy a Hamiltonian with full connectivity between the bipartitions, the goal of one embodiment of the present invention is to apply an evolution from each vertex u in one partition U to each vertex v in the other partition V.

Embodiments of the present invention include general methods and systems for an arbitrary a×b lattice, such as the following. First consider a max{m, n}×2 lattice, such as lattice 500 in FIG. 5, which is a 6×2 lattice with 6 vertices in U and 4 vertices in V with 2 filler qubits.

Figure 5:
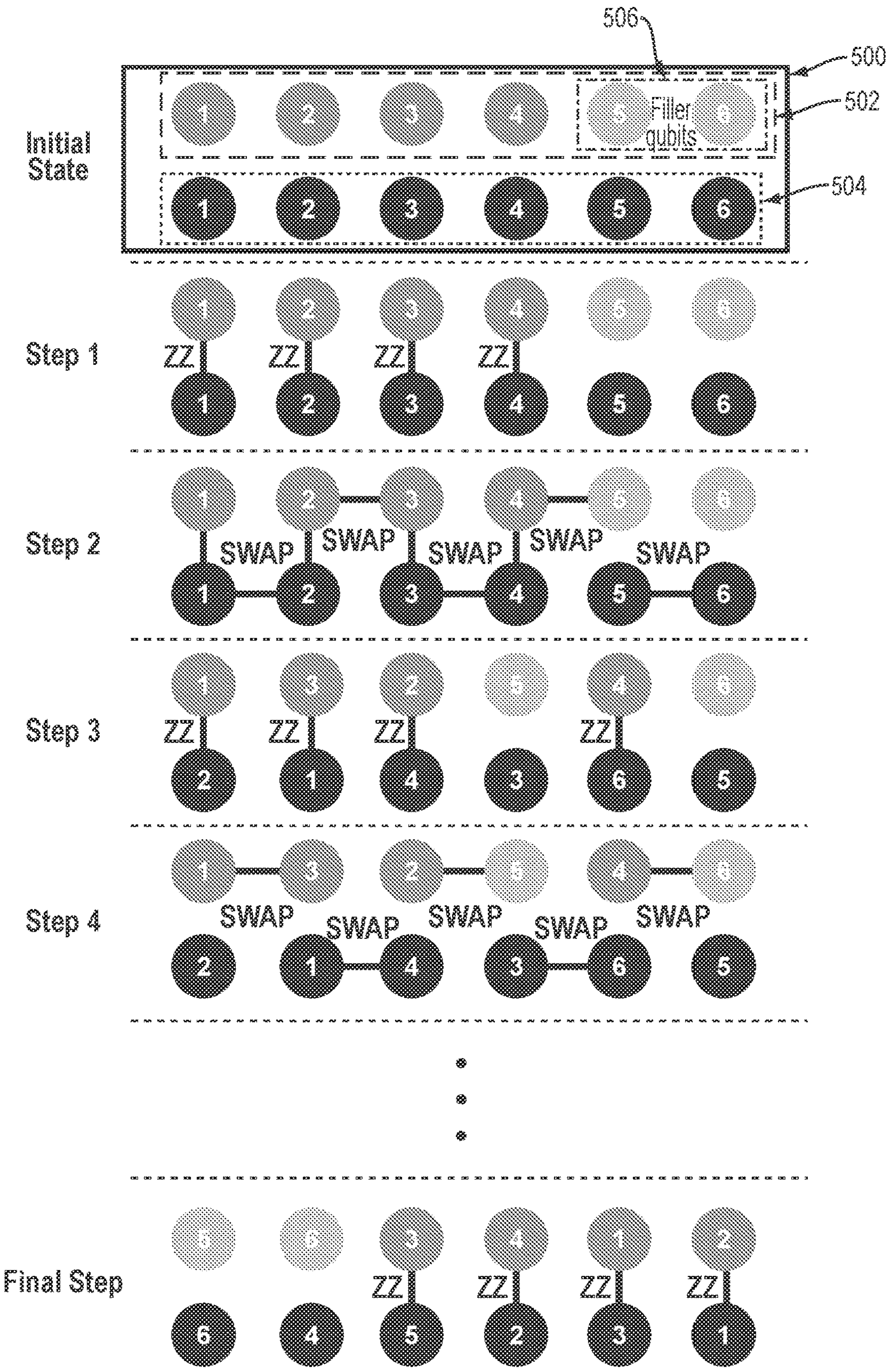
FIG. 5 illustrates a method for evolving a lattice of qubits according to one embodiment of the present invention.

Assume without loss of generality that m n, where each of m and n may be any number. A method according to one embodiment of the present invention is as follows, and is illustrated in FIG. 5.

Notation: Let a first plurality of qubits 502 form the first row of the lattice 500. The first plurality 502 corresponds to vertices from V. A second plurality of qubits 504 forms the second row of the lattice 500; these m qubits 504 correspond to vertices from U.

The lattice may include a number of "filler" qubits 506; the filler qubits 506 may be set to $|0\rangle$ or any other reference state. The number of filler qubits may be equal to m−n. The particular number and location of the filter qubits shown in FIG. 5 is merely an example and does not constitute a limitation of the present invention. For example, although there are two filler qubits 506 in FIG. 5, there may be any number of filler qubits, such as one, two, or more than two filler qubits. Furthermore, although the filler qubits 506 in FIG. 5 are on the right end of the first plurality of qubits 502, this is merely an example and does not constitute a limitation of the present invention. The filler qubits may be in any position within either plurality of qubits. Furthermore, although the filler qubits 506 in FIG. 5 are consecutive with each other, this is merely an example and does not constitute a limitation of the present invention. For example, any two or more of the filler qubits may be non-consecutive with each other. In other words, any two filler qubits may have one or more non-filler qubits between them.

The number n of qubits in the first plurality of qubits 502 plus the number of filler qubits 506 may be equal to the number m of qubits in the second plurality of qubits 504. Although it is assumed for the sake of example that m n, if instead n m, then the number m of qubits in the second plurality of qubits 504 plus the number of filler qubits 506 may be equal to the number n of qubits in the first plurality of qubits 502. As this implies, the filler qubits 506 may be in the second plurality of qubits 504 (e.g., in the second row of the lattice 500) instead of the first plurality of qubits 502 (e.g., in the first row of the lattice). The purpose of the filler qubits is to ensure that it is possible to implement embodiments of the present invention when the number of vertices differs between the two bipartitions of the graph.

Although for purposes of example the first plurality of qubits 502 is described herein as constituting the first row of the lattice 500 and the second plurality of qubits 504 is described herein as constituting the second row of the lattice 500, instead the first plurality of qubits 502 may constitute the second row of the lattice 500 and the second plurality of qubits 504 may constitute the first row of the lattice 500. In such embodiments, any description herein that refers to the first row of the lattice 500 applies to the second plurality of qubits 504, and any description herein that refers to the second row of the lattice 500 applies to the first plurality of qubits 502.

Let the initialized qubits in the $k^{th}$ column of the first row be denoted as $v_k$ and in the second column as $u_k$. Denote the configuration $C_i$ as the arrangement of qubits in the lattice 500 before the $i^{th}$ set of SWAP gates. $C_1$ refers to the initial configuration (labeled in FIG. 5 as "Initial State"), $C_2$ refers to the configuration after the first set of SWAP gates (labeled in FIG. 5 as "Step 3"), and so on.

Throughout the method of FIG. 5, we refer to pairs of qubits; denote each such pair of qubits x and y by {x, y}. We say the pair {x, y} is a "swapped pair" if a SWAP gate has been applied between qubits x and y at some point in the method. Similarly, we say the pair {x, y} is an "entangled pair" if the W gate has been applied between qubits x and y at some point in the protocol. In one embodiment of the present invention, steps of the method of FIG. 5 are as follows:

1. In parallel, apply the gate W (such as a ZZ interaction) between all non-filler pairs of qubits in the same column of the lattice 500 (see "Step 1" in FIG. 5). This step generates n entangled pairs of qubits in the lattice 500 (illustrated in FIG. 5 by qubit pairs having a line labeled "ZZ" between them, which indicates that the n entangled pairs of qubits in the lattice 500 may, for example, be entangled via quantum gates applying ZZ interactions).
2. In the first row 502 of the lattice 500, apply a SWAP gate on qubit pairs in the original positions of $\{v_1, v_2\}$, $\{u_3, v_4\}$, . . . (refer to SWAPs of this type as the "odd swaps criterion") (see "Step 2" in FIG. 5). In the second row 504 of the lattice 500, apply a SWAP gate on qubit pairs $\{u_2, u_3\}$, $\{u_4, u_5\}$, . . . (refer to SWAPs of this type as the "even swap criterion"), including the filler qubits 506. Alternatively, embodiments of the present invention may instead apply even swaps to V and odd swaps to U; it is important only that the swap criterion between U and V differs.
3. Repeat Step 1 (see "Step 3" in FIG. 5). Note that, as shown in FIG. 5, "repeating" Step 1 in Step 3 results in applying the gate W between different pairs of qubits in Step 3 than in Step 1.
4. In the first column of the lattice 500, apply a SWAP gate with respect to the original positions of $\{v_2, v_3\}$, $\{v_4, v_5\}$, . . . (i.e. those at the very beginning of the method); in the second column, apply a SWAP gate with respect to the positions of qubit pairs $\{u_1, u_2\}$, $\{u_3, u_4\}$, . . . at the very beginning of the method including the filler qubits (see "Step 4" in FIG. 5).
5. Perform steps 1-4 repeatedly, stopping once each qubit of a subset of the first plurality of qubits is part of an entangled pair with each qubit of the second plurality of qubits.

The gate depth D of a circuit applying the method of FIG. 5 is D=O(max{n, m}). Note also that there cannot be a sub-linear depth scheme unless the hardware natively supports multi-edge evolutions.

Figure 6:
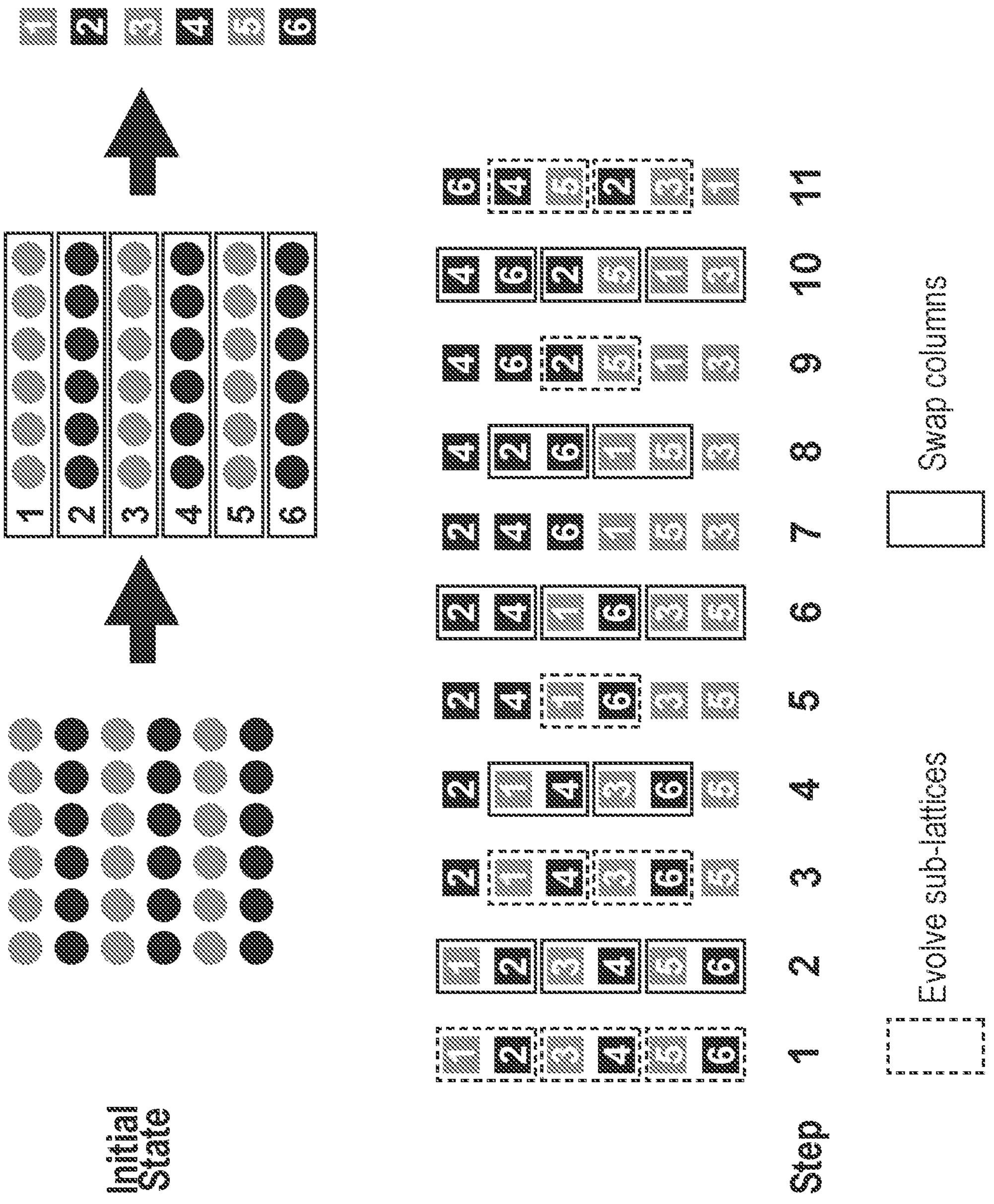
FIG. 6 illustrates a method for evolving a 6×6 lattice with 18 vertices in U and 18 vertices in V with no filler qubits according to one embodiment of the present invention.

To generalize to a larger lattice, embodiments of the present invention may initialize by arranging the columns of the lattice with alternating elements from U and V. Each sublattice may be trained using the 2×max{n, m} method described above. This may be followed by SWAPs between columns of the lattice, using the same alternating approach as in Steps 1-4, described above. For example, FIG. 6 illustrates a 6×6 lattice with 18 vertices in U and 18 vertices in V with no filler qubits.

Note that methods implemented according to embodiments of the present invention (such as the methods of FIG. 5 and FIG. 6) may be embedded onto a device with an odd-numbered lattice as well, and that filler qubits may also be used in the vertices for U if the bipartite graph does not match the dimensions of the hardware lattice ideally.

Referring to FIG. 7, a flowchart is shown of a method 700 performed by one embodiment of the present invention. The method 700 may, for example, be performed by a quantum computer (e.g., the quantum computer 102) or a hybrid quantum-classical computer (e.g., the hybrid quantum-classical computer 300). Therefore, any reference to a quantum computer in the description of the method 700 of FIG. 7 should be understood to be applicable, for example, to the quantum computer 102. Similarly, any reference to a hybrid quantum-classical computer in the description of the method 700 of FIG. 7 should be understood to be applicable, for example, to the hybrid quantum-classical computer 300.

The method 700 is a method for evolving a lattice of qubits (e.g., the lattice 500) in a quantum computer. The lattice of qubits includes a first plurality of qubits in the quantum computer (e.g., qubits 502) and a second plurality of qubits in the quantum computer (e.g., qubits 504). Each qubit in the first plurality of qubits is adjacent to at least one qubit in the second plurality of qubits.

The method 700 includes: (A) applying, in parallel, a first set of quantum gates between the first plurality of qubits and the second plurality of qubits to create a first set of entangled pairs of qubits (FIG. 7, operation 702). The method 700 further includes: (B) after (A), swapping, in parallel, pairs of qubits (FIG. 7, operation 704), the swapping 704 comprising: (B)(1) swapping pairs of adjacent qubits in the first plurality of qubits according to a first swap criterion (FIG. 7, operation 706); and (B)(2) swapping pairs of adjacent qubits in the second plurality of qubits according to a second swap criterion (FIG. 7, operation 708). The second swap criterion differs from the first swap criterion.

The method 700 may, for example, further include: (C) after (B), applying, in parallel, a second set of quantum gates between the first plurality of qubits and the second plurality of qubits to create a second set of entangled pairs of qubits (FIG. 7, operation 710).

The method 700 may further include: (D) after (C), swapping, in parallel, pairs of qubits (FIG. 7, operation 712). The swapping 712 may include: (1) swapping pairs of adjacent qubits in the first plurality of qubits according to the second swap criterion (FIG. 7, operation 714); and (2) swapping pairs of adjacent qubits in the second plurality of qubits according to the first swap criterion (FIG. 7, operation 716).

The method 700 may further include determining whether each qubit of a subset of the first plurality of qubits is part of an entangled pair with each qubit of the second plurality of qubits (FIG. 7, operation 718). If each qubit of the subset is determined to be part of an entangled pair with each qubit of the second plurality of qubits, then the method 700 ends (FIG. 7, operation 720). Otherwise, the method 700 repeats operations 702-718 until the condition of operation 718 is satisfied, at which point the method 700 ends.

As the above implies, the method 700 may further include: (E) after (D), repeating (A)-(D) until each qubit of a subset of the first plurality of qubits is part of an entangled pair with each qubit of the second plurality of qubits.

The method 700 may further include: (F) after (E), measuring at least one qubit in the lattice of qubits to generate an output state.

The first set of quantum gates may include one or more ZZ-interactions.

The first swap criterion may be an even swap criterion or an odd swap criterion.

The method 700 may further include using a classical computer to control the quantum computer to perform (A) and (B). The classical computer may include at least one processor and at least one non-transitory computer-readable medium having computer program instructions stored therein. The computer program instructions may be executable by the at least one processor to cause the classical computer to control the quantum computer to perform (A) and (B).

Figure 3:
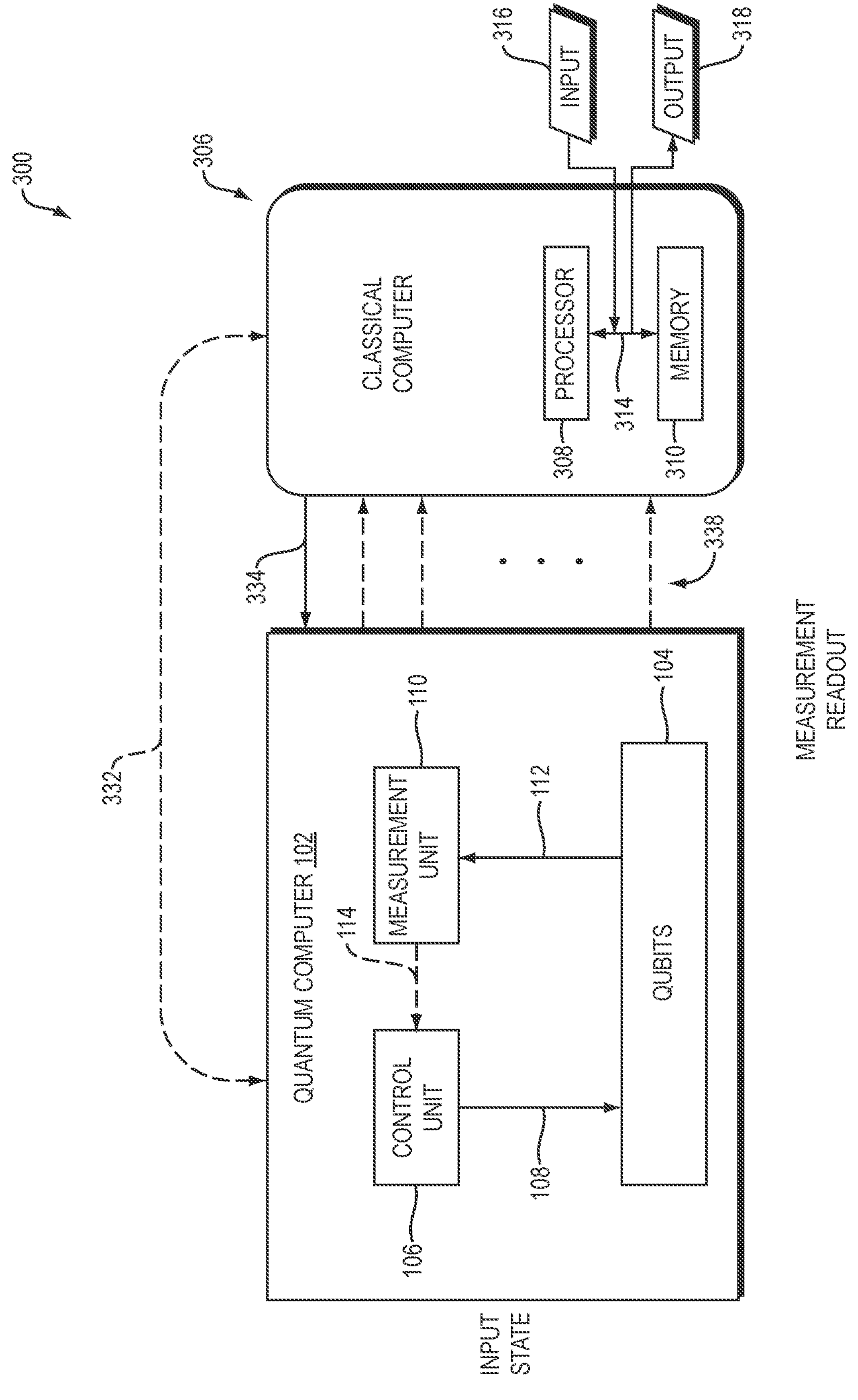
FIG. 3 is a diagram of a hybrid quantum-classical computer according to one embodiment of the present invention.

A hybrid quantum-classical computing system, such as the hybrid quantum-classical computer 300 of FIG. 3, may perform the method 700 of FIG. 7. Such a hybrid quantum-classical computing system may include a quantum computer and a classical computer. The quantum computer may include a plurality of qubits and a qubit controller that manipulates the plurality of qubits. The plurality of qubits may include the first plurality of qubits and the second plurality of qubits. The classical computer may store machine-readable instructions that, when executed by the classical computer, control the classical computer to cooperate with the quantum computer to perform the method 700 of FIG. 7.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to an d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred to as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
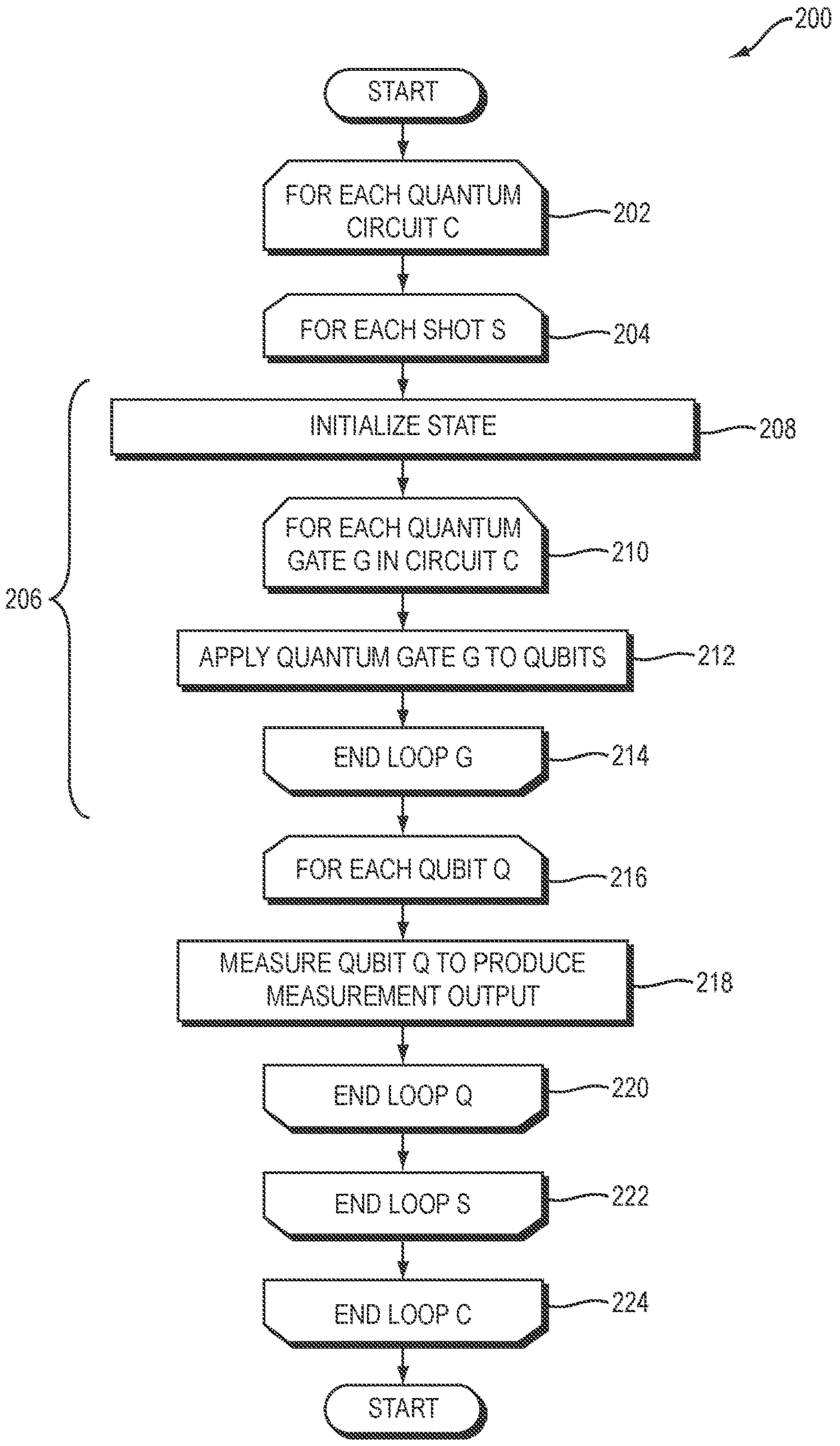
FIG. 2A is a flowchart of a method performed by the quantum computer of FIG. 1 according to one embodiment of the present invention.
Figure 2B:
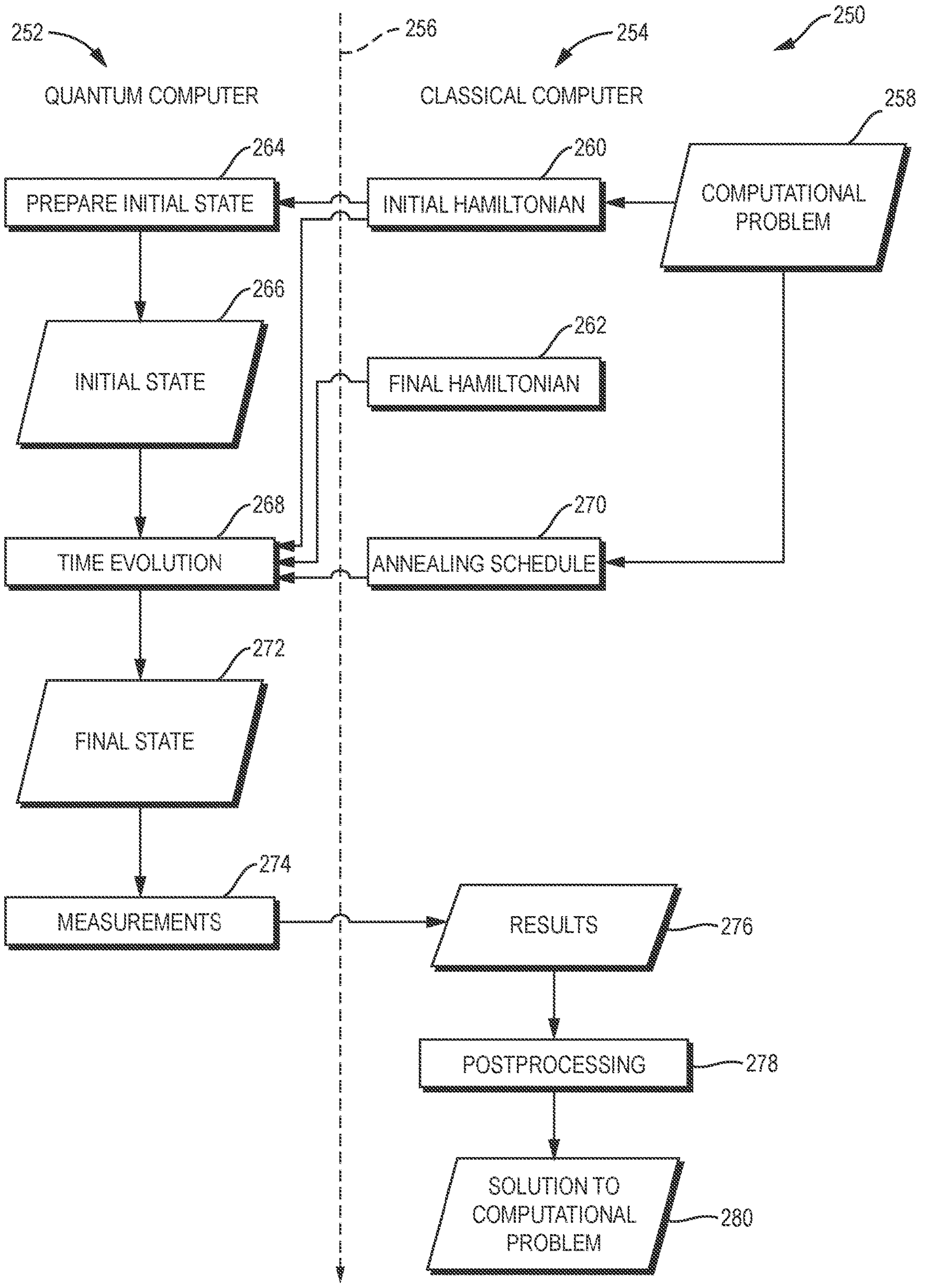
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
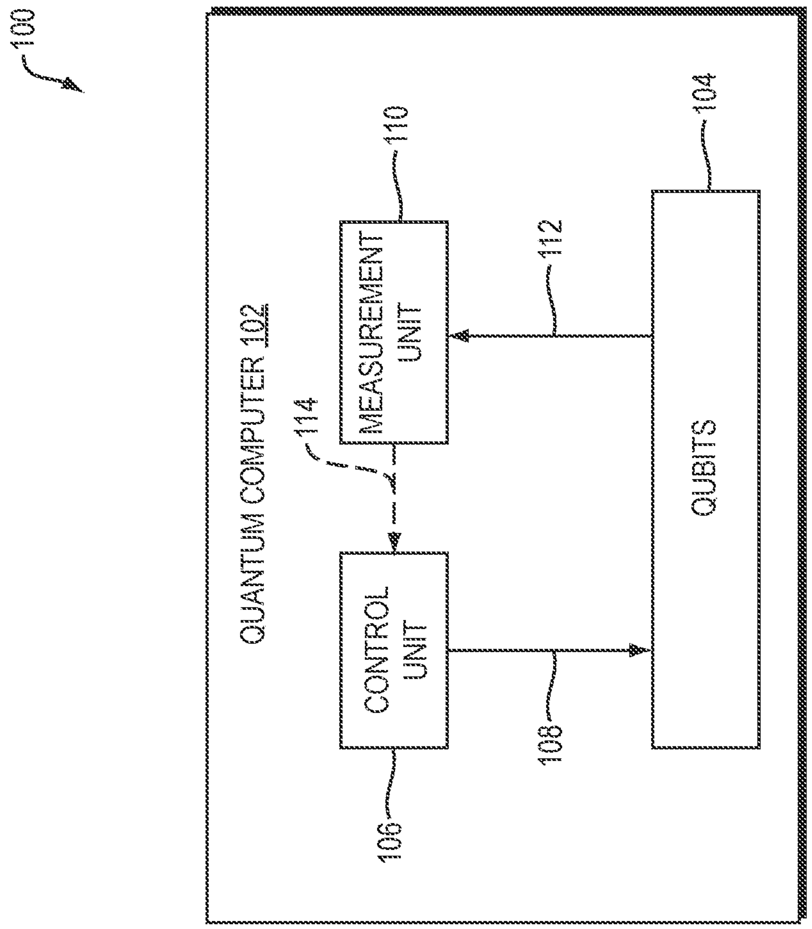
FIG. 1 is a diagram of a quantum computer according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

- In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.
- In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback 114 from the measurement unit 110 to the control unit 106. Such feedback 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Referring to FIG. 3, a diagram is shown of a hybrid classical quantum computer (HQC) 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals Y32 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals Y34 to the quantum computer 102, in response to which the quantum computer 102 may apply the gate operations specified by the control signals Y32 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output Y38 representing the collapse of the states of the qubits 104 into one of their eigenstates. As a result, the measurement output Y38 includes or consists of bits and therefore represents a classical state. The quantum computer 102 provides the measurement output Y38 to the classical processor 308. The classical processor 308 may store data representing the measurement output Y38 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid classical quantum (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, as the coherence time of superconducting qubit processors is typically less than a millisecond, it would be impossible to manually apply even a single quantum gate in this time frame.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure (s).

The invention claimed is:

1. A method for evolving a lattice of qubits in a quantum computer, wherein the lattice of qubits is an a×2 lattice comprising a first row and a second row, the lattice of qubits comprising a first plurality of qubits forming the first row in the quantum computer and a second plurality of qubits forming the second row in the quantum computer, wherein each qubit in the first plurality of qubits is adjacent to at least one qubit in the second plurality of qubits located in a same column, the method comprising:

(A) applying, in parallel, a first set of quantum gates between the first plurality of qubits and the second plurality of qubits to create a first set of entangled pairs of qubits in respective columns of the lattice;

(B) after (A), swapping, in parallel, pairs of qubits, the swapping comprising:

(B)(1) swapping pairs of adjacent qubits in the first plurality of qubits within the first row according to a first swap criterion, and (B)(2) swapping pairs of adjacent qubits in the second plurality within the second row of qubits according to a second swap criterion, wherein the second swap criterion differs from the first swap criterion;

(C) after (B), applying, in parallel, a second set of quantum gates between the first plurality of qubits and the second plurality of qubits to create a second set of entangled pairs of qubits; and (D) after (C), swapping, in parallel, pairs of qubits, the swapping comprising:

(D)(1) swapping pairs of adjacent qubits in the first plurality of qubits according to the second swap criterion, and (D)(2) swapping pairs of adjacent qubits in the second plurality of qubits according to the first swap criterion.

2. The method of claim 1, further comprising: (E) after (D), repeating (A)-(D) until each qubit of a subset of the first plurality of qubits is part of an entangled pair with each qubit of the second plurality of qubits.

3. The method of claim 2, further comprising:

(F) after (E), measuring at least one qubit in the lattice of qubits to generate an output state.

4. The method of claim 1, wherein the first set of quantum gates comprises a ZZ interaction.

5. The method of claim 1, wherein the first swap criterion comprises an even swap criterion.

6. The method of claim 1, wherein the first swap criterion comprises an odd swap criterion.

7. The method of claim 1, further comprising using a classical computer to control the quantum computer to perform (A) and (B), the classical computer comprising at least one processor and at least one non-transitory computer-readable medium having computer program instructions stored therein, the computer program instructions being executable by the at least one processor to cause the classical computer to control the quantum computer to perform (A) and (B).

8. A hybrid quantum-classical computing system for evolving a lattice of qubits in a quantum computer, wherein the lattice of qubits is an a×2 lattice comprising a first row and a second row, the lattice of qubits comprising a first plurality of qubits forming the first row in the quantum computer and a second plurality of qubits forming the second row in the quantum computer, wherein each qubit in the first plurality of qubits is adjacent to at least one qubit in the second plurality of qubits located in a same column, the hybrid quantum-classical computing system comprising:

the quantum computer, the quantum computer including a plurality of qubits and a qubit controller that manipulates the plurality of qubits, the plurality of qubits including the first plurality of qubits and the second plurality of qubits; and a classical computer storing machine-readable instructions that, when executed by the classical computer, control the classical computer to cooperate with the quantum computer to perform a method, the method comprising:

(A) applying, in parallel, a first set of quantum gates between the first plurality of qubits and the second plurality of qubits to create a first set of entangled pairs of qubits in respective columns of the lattice;

(B) after (A), swapping, in parallel, pairs of qubits, the swapping comprising:

(B)(1) swapping pairs of adjacent qubits in the first plurality of qubits within the first row according to a first swap criterion, and (B)(2) swapping pairs of adjacent qubits in the second plurality of qubits within the second row according to a second swap criterion, wherein the second swap criterion differs from the first swap criterion;

(C) after (B), applying, in parallel, a second set of quantum gates between the first plurality of qubits and the second plurality of qubits to create a second set of entangled pairs of qubits; and (D) after (C), swapping, in parallel, pairs of qubits, the swapping comprising:

(D)(1) swapping pairs of adjacent qubits in the first plurality of qubits according to the second swap criterion; and (D)(2) swapping pairs of adjacent qubits in the second plurality of qubits according to the first swap criterion.

9. The hybrid quantum-classical computing system of claim 8, wherein the method further comprises: (E) after (D), repeating (A)-(D) until each qubit of a subset of the first plurality of qubits is part of an entangled pair with each qubit of the second plurality of qubits.

10. The hybrid quantum-classical computing system of claim 9, wherein the method further comprises:

(F) after (E), measuring at least one qubit in the lattice of qubits to generate an output state.

11. The hybrid quantum-classical computing system of claim 8, wherein the first set of quantum gates comprises a ZZ interaction.

12. The hybrid quantum-classical computing system of claim 8, wherein the first swap criterion comprises an even swap criterion.

13. The hybrid quantum-classical computing system of claim 8, wherein the first swap criterion comprises an odd swap criterion.

* * * * *